United States Patent [19]

Hokenek et al.

[11] Patent Number: 4,926,369
[45] Date of Patent: May 15, 1990

[54] LEADING 0/1 ANTICIPATOR (LZA)

[75] Inventors: Erdem Hokenek, Yorktown Heights, N.Y.; Robert K. Montoye, Austin, Tex.

[73] Assignee: International Business Machines Corporation, Armonk, N.Y.

[21] Appl. No.: 255,089

[22] Filed: Oct. 7, 1988

[51] Int. Cl.$^5$ .............................................. G06F 7/38
[52] U.S. Cl. ................................ 364/748; 364/715.04; 364/715.10
[58] Field of Search .............. 364/748, 715.03, 715.04, 364/715.10

[56] References Cited

U.S. PATENT DOCUMENTS 3,831,012  8/1974  Tate et al. ............................ 364/748
4,794,557  12/1988 Yoshida et al. ...................... 364/748

FOREIGN PATENT DOCUMENTS 57-196351  12/1982  Japan .

Primary Examiner—Gary V. Harkcom
Assistant Examiner—Long T. Nguyen
Attorney, Agent, or Firm—Thomas P. Dowd

[57] ABSTRACT

A method and system for performing a leading 0/1 anticipation (LZA) in parallel with the floating-point addition of two operands (A and B) in a computer to significantly reduce the Addition-Normalization time. A combinational network is used to process appropriate XOR (P), AND (G) and NOR (Z) state signals resulting from the comparison of the bits in corresponding bit positions of the operands (A and B), starting with the most significant bit (MSB) side of the addition. The state of the initial state signal is detected and shift amount signals are produced and counted for each successive state signal detected, as long as the state remains TRUE. When the state becomes NOT TRUE, adjustments are made depending on the initial state and the successive state, and production of the shift amount signals is halted and an adjustment signal is produced. To determine the exponent of the sum of the floating-point addition, the shift amount count is summed with the adjustment signal. The latter sum will be the exponent of the sum of the operands thus providing a normalized result. The adjustment signal may be based on the CARRY at the NOT TRUE bit position, and the state at the NOT TRUE position may be used to determine whether the result of the addition is positive or negative. In addition to a serial network, an implementing network of a parallel form which accepts appropriate state inputs as blocks of n bits in length, is disclosed, along with certain special implementations.

16 Claims, 9 Drawing Sheets

FIG. 12
INPUT STAGE

FIG. 13
INPUT STAGE

FIG. 14

LEADING 0/1 ANTICIPATOR (LZA)

BACKGROUND OF THE INVENTION

1. Field of the Invention

The present invention involves a method and system for reducing the time needed to complete an Addition-Normalization operation in a computer and more particularly for normalizing the result of a floating point addition in a computer by carrying out leading zero processing in parallel with the addition of the operands.

2. Prior Art

In electronic computations normalization is used as a means for referencing a number to a fixed radix point. Normalization strips out all leading sign bits such that the two bits immediately adjacent to the radix point are of opposite polarity. Table I exemplifies a 32-bit register containing certain floating point numbers. When the Normalize command is applied, the bits in the unnormalized numbers will be shifted toward the most significant bit (MSB) of the register until the bits on either side of the radix point are of opposite value. The numbers are then considered to be normalized as indicated in the Table. It will be seen that a negative number is normalized in the same manner as a positive number and after the illustrated operations it is necessary that the exponent of the floating-point numbers be adjusted according to the shift amount.

TABLE I

|  | Radix Point |
| --- | --- |
| Unnormalized Positive Number | 0'00000010111100011011100111000100 |
|  | MSB                                LSB |
| After Normalization | 0'10111100011011100111000100000000 |
|  | MSB                                LSB |
| Unnormalized Negative Number | 1'11111101000011100100110001111011 |
|  | MSB                                LSB |
| After Normalization | 1'01000011100100110001110110000000 |
|  | MSB                                LSB |

Heretofore in order to normalize a floating point addition, typically the following three steps were performed:

1. The two terms or operands A and B were added (a process requiring a minimum of log(N) time);
2. The result was searched for the leading 0/1 (depending upon the sign of the result), that is, the "leading zero" was detected (LZD); and
3. The result of the addition was shifted by an appropriate amount.

Examples of various embodiments of prior art systems utilizing this LZD approach are found in U.S. Pat. No. 4,631,696 to Sakamoto, U.S. Pat. No. 4,644,490 to Kobayashi et al, U.S. Pat. No. 4,649,508 to Kanuma, and Jap. Pat. No. 57-196351 of Sakamoto. While some forecasting during the adding is found in these teachings, notably in the Japanese patent wherein generation of the carry is forecast, still it is generally necessary to wait for the completion of the addition function before beginning the operation to normalize the result, so that this activity in the prior art is compatively time consuming. Consequently, in order to reduce the time needed to complete the Addition-Normalization operation, the present invention provides a method and system in which the leading 1/0 detection may be performed at the same time as the addition (subject only to a single bit correction).

SUMMARY OF THE INVENTION

In contrast to the prior art leading 0/1 detection (LZD), which, as noted above, is carried out after the completion of the addition of the two operands A and B in a computerized floating-point addition, the present invention performs a leading 0/1 anticipation (LZA) in parallel with the addition operation. As a result, the Addition-Normalization time required in electronic processing equipment may be significantly reduced.

The improved operation is accomplished using a combinational network which processes appropriate XOR (Propagate), AND (Generate), and NOR (Zero) state signals resulting from the comparison of the bits in corresponding bit positions of the operands (A and B), starting with the most significant bit (MSB) side of the addition. The state of the initial state signal is detected and, if the state is G or Z, a signal is produced indicating a shift amount, which amount is counted for each successive state signal detected, as long as the state remains TRUE. When the state becomes NOT TRUE, production of the shift amount signals is halted and an adjustment signal is produced. To determine the exponent of the sum of the floating point addition, the shift amount count is summed with the adjustment signal. The latter sum will be the exponent of the sum of the operands thus providing a normalized result. The adjustment signal may be based on the CARRY at the NOT TRUE bit position, and the state at the NOT TRUE position may be used to determine whether the result of the addition is positive or negative.

When the initial state is P, halting of the shift amount signals becomes dependent upon the state of the state signal for the bit position following the NOT TRUE bit position. If the second state (G or Z) at the NOT TRUE position is followed by a state signal of the third state, then production of the shift amount signals is continued until the third state becomes NOT TRUE. Otherwise, the shift signals are halted one bit position following the NOT TRUE position. In these cases the adjustment signal may be based on the CARRY at the bit position at which the shift signals are halted, and the state at that position may be used to determine whether the result of the addition is positive or negative.

In addition to a serial network, an implementing network may be of a parallel form which accepts appropriate state inputs as blocks of n bits in length, comprising $Z_1$ to $Z_n$, $P_1$ to $P_n$, and $G_1$ to $G_n$ state signals resulting from the comparing of the bits in corresponding bit positions, and in response produces intermediate state outputs comprising ZZ, PP, PZ, PG, and GG signals. By ORing these intermediate state outputs, signals indicative of a shift count and an adjustment signal may be created based on the bit position at the end of the shift count. Summing the shift count with the adjustment signal may then be used to determine the exponent of the sum of the floating point addition of the operands (A and B). Modifications and simplifications of the basic implementing network are possible for special cases.

DETAILED DESCRIPTION OF THE INVENTION

Figure 1:
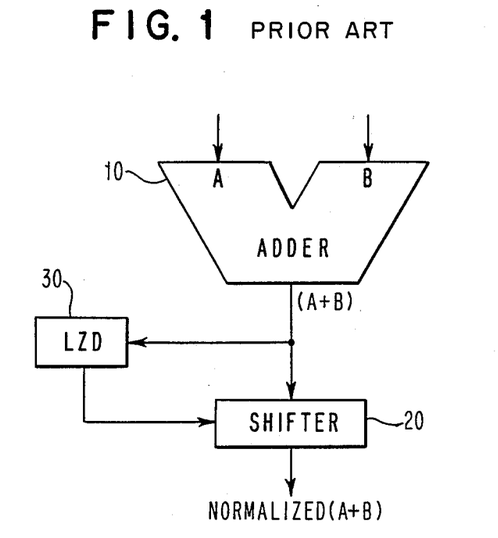
FIG. 1 is a schematic diagram illustrating a prior art system for a Addition-Normalization operation involving the addition of two operands A and B in a computerized floating-point addition.
Figure 2:
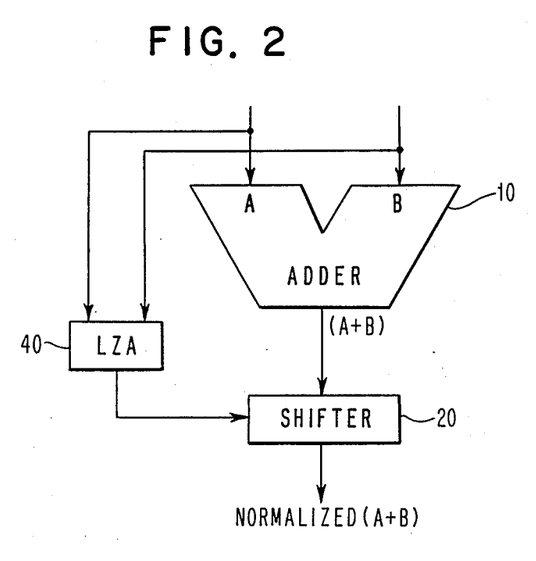
FIG. 2 is a schematic diagram illustrating the system for the Addition-Normalization operation involving the addition of two operands A and B in a computerized floating-point addition in accordance with the present invention.

The present invention is directed to performing a leading 0/1 anticipation (LZA) in parallel with the addition of the two operands A and B in a computerized floating-point addition, so that the Addition-Normalization time may be significantly reduced. By way of brief explanation, in the prior art, as illustrated in FIG. 1, generally the result of an addition of operands A and B in a floating-point adder 10 is communicated to both a shifter 20 and a leading-zero-detection (LZD) logic unit 30. The output of the LZD unit 30, when the leading-zero is detected, is used to operate the shifter 20 to then produce an output indicative of the normalized result. In contrast, as shown in FIG. 2, a leading-zero-anticipation (LZA) logic unit 40 in accordance with the present invention receives the operands A and B in parallel with the adder 10 and provides its output to the shifter 20 substantially coincidentally with the receipt of the result of the addition so that the normalized result is produced more quickly thus increasing the speed of the floating-point-addition operation.

More specifically, in order to provide an implementing system for accomplishing this end an iterative combinational network is disclosed with operations and combinations of components as will be understood from the following detailed description.

To begin with, suppose that one of the unnormalized floating point numbers depicted in TABLE I above is the result of a floating point addition (A+B). This addition for all values of A and B has essentially four possible cases:

1. $A>0$, $B>0$, $A+B>0$ (Unnormalized Positive Number)

2. $A<0$, $B<0$, $A+B<0$ (Unnormalized Negative Number)

3. $A>0$, $B<0$, $A+B>0$ (Unnormalized Positive Number)

4. $A>0$, $B<0$, $A+B<0$ (Unnormalized Negative Number)

Since ($A<0$, $B>0$) turns out to be case (3) or case (4), it can be handled by simply interchanging the register names A and B.

Now it is possible to define three auxiliary equations which describe the Bit-to-Bit relations of the two operands A and B. These logical expressions are:

$$Z_i = \text{NOR}(a_i, b_i) \tag{II.1}$$

$$P_i = \text{XOR}(a_i, b_i) \tag{II.2}$$

$$G_i = \text{AND}(a_i, b_i) \tag{II.3}$$

It will be seen that the logical functions defined above are very similar to those used in a Carry-Lookahead Adder (CLA) found in general purpose computers, such as an IBM 370 or the like. In fact, P, G, and Z signals may be generated in such computers without the use of any additional circuitry since they already are required for the CLA function so that the invention may be readily carried out on these computers. Accordingly, the inputs for the purposes of the invention will be these P, G, Z signals, one of which can be TRUE (1) at each bit position.

Now considering all possible cases in detail, the finite-state representation of a leading 0/1 anticipator (LZA) in accordance with the present invention may be constructed.

Case 1: $A>0$, $B>0$, $A+B>0$

As is well known, there are numerous combinations of A and B resulting in a given number. Two interesting combinations of A and B which yield the same result are given in TABLE II as follows:

TABLE II

| | | |
|---|---|---|
| (a) | A | 0 0000001000100001001000101000000 |
| | B | 0 0000000011010000100100010000100 |
| | | Z ZZZZZZZPZPPPPZZZPPZPPZZPPPZZZPZZ |
| | | CARRY=0 |
| (b) | A | 0 0000000100100001001000101000000 |
| | B | 0 0000001110100001001000010000100 |
| | | Z ZZZZZZZGPPPPZZZPPZPPZZPPPZZZPZZ |
| | | CARRY=1 |
| | MSB | LSB |

The state description for the LZA can be obtained from considering the examples in Table II. First of all, leading 0/1 anticipation should be carried out starting from the Most Significant Bit (MSB) side of the addition. Other statements can be summarized as follows:

1.1- If the MSB is a Z-signal then the LZA enters into a Z-state and remains unchanged as long as the Z-signal is TRUE, i.e. (1).

1.2- For each Z-input, the LZA generates a LEFT-SHIFT signal (SHL).

1.3- The leading 0/1 anticipation is finished when the kth Z-input is NOT TRUE, namely (0). Subsequently, the LZA takes the CARRY into the kth Z-position into account and creates an ADJUSTMENT signal (AD) according to $$AD = CARRY \qquad (II.4)$$

The AD-output is a single RIGHT-SHIFT signal resulting in a total shift:

$$SH = SHL - AD \qquad (II.5)$$

The total shift amount (SH) is important for changing the exponent of the floating-point number.

It will be seen that a simple 'NOR' of the bits produces a result which differs from the final normalization by less than the CARRY output.

Referring to the example in TABLE II, the total shift amounts are given by:

(a) SHL=6, AD=0, SH=6.

(b) SHL=7, AD=1, SH=6.

Figure 3:
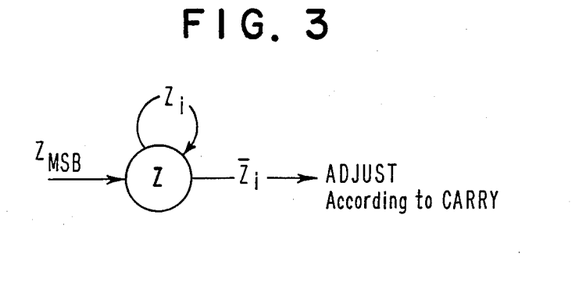
FIG. 3 illustrates a finite state diagram for one possible combination of operands in accordance with the present invention.

The state diagram obtained by the above discussion is shown in FIG. 3.

Case 2: A<0, B<0, A+B<0

As can be seen, this case corresponds to an addition of two negative numbers.

TABLE III

| (a) | A | 1 1111111000001000100000000101001 |
| | B | 1 1111111100001010000011000010010 |
| | | G GGGGGGGPZZZZPPPZZPZZPPZZZPPPZPP |
| | | CARRY=0 |
| (b) | A | 1 1111110110000100010000000101001 |
| | B | 1 1111111100010100000110000010010 |
| | | G GGGGGGPGGZZZPPPZZPZZPPZZZPPPZPP |
| | | CARRY=1 |
| | MSB | LSB |

Starting from the examples presented in TABLE III, 2.1- If the MSB is a G-signal then the LZA enters into the G-state and remains unchanged as long as the G-signal is TRUE, i.e. (1).

2.2- For each G-input, the LZA generates a LEFT-SHIFT signal (SHL).

2.3- The leading 0/1 anticipation is finished when the kth G-input is NOT TRUE, namely (0). Subsequently, the LZA takes the CARRY into the kth G-position into account and creates an ADJUSTMENT signal (AD) according to $$AD = INV(CARRY) \qquad (II.6)$$

which means, if CARRY=0 then AD=1, and if CARRY=1 then AD=0.

Contrary to the previous case, the LZA for (A<0, B<0) continues as long as the bit comparison on the MSB side of both operands is TRUE. This duality originates from binary complementing the operands in order to obtain the negative numbers. Performing the LZA for $$(-A) + (-B) ---- (-)(A+B) \qquad (II.7)$$
$$\text{Case 2} \qquad \text{Case 1}$$

will yield the same shift amounts.

Figure 4:
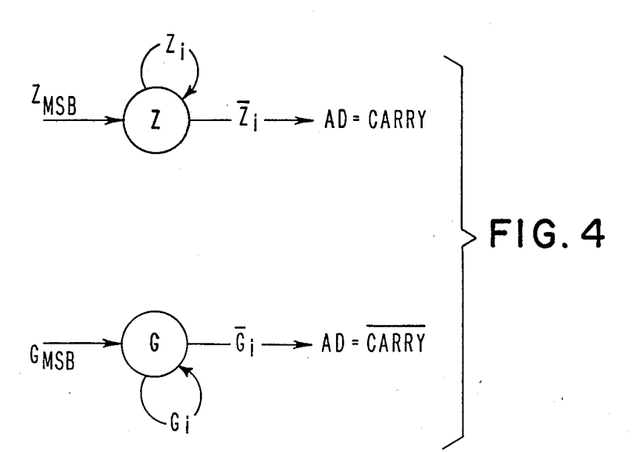
FIG. 4 is an extended finite state diagram including another possible combination of operands in accordance with the present invention.

Finally, the state diagram can be extended as shown in FIG. 4.

Case 3: A>0, B<0, A+B>0

This case corresponds to a substraction resulting in a positive number.

TABLE IV

| (a) | A | 0 0000001100100001001000101000000 |
| | B | 1 1111111111010000100100010000100 |
| | | P PPPPPPGGPPPPZZZPPZPPZZPPPPZZZPZZ |
| | | CARRY=1 |
| (b) | A | 0 0000010111100100100010100000 |
| | B | 1 1111111111110001001000100000100 |
| | | P PPPPPPGPGGGGGZZZPPZPPZZPPPPZZZPZZ |
| | | CARRY=1 |
| (c) | A | 0 0010000111110010010001010000000 |
| | B | 1 1110000111111000100100010000100 |
| | | P PPGZZZZPGGGGGZZPPZPPZZPPPZZZPZZ |
| | | CARRY=1 |
| (d) | A | 0 0010000101000010010001010000000 |
| | B | 1 1110001001010000100100010000100 |
| | | P PPGZZZPZPPPPZZZPPZPPZZPPPZZZPZZ |
| | | CARRY=0 |
| | MSB | LSB |

Now extending the statements given in the previous case using the above examples:

3.1- If the MSB is a P-signal then the LZA enters into a P-state and remains unchanged as long as the P-signal is TRUE, i.e. (1).

3.2- For each P-input, the LZA generates a LEFT-SHIFT signal (SHL).

3.3- If the jth input signal is a G-signal then the new state will be the Z-state which has been presented in the previous case. The LZA will create a LEFT-SHIFT output and go to statement (1.2).

Referring to the example in TABLE IV, the total shift amounts are given by:

(a) SHL=7, AD=1, SH=6.

(b) SHL=7, AD=1, SH=6.

(c) SHL=7, AD=1, SH=6.

(d) SHL=6, AD=0, SH=6.

Figure 5:
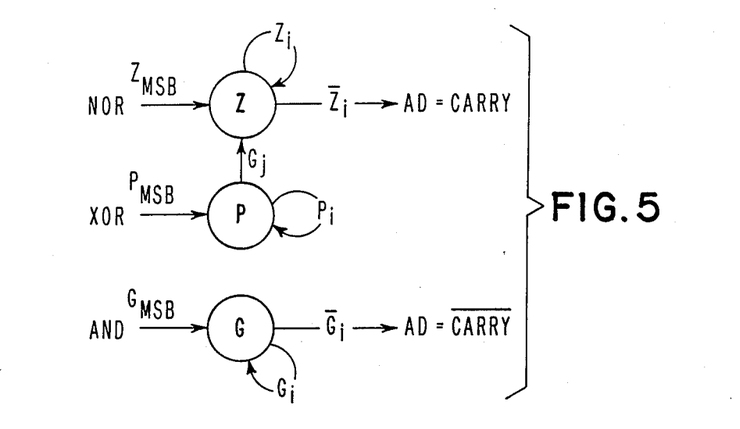
FIG. 5 is an additionally extended finite state diagram including a further possible combination of operands in accordance with the invention.

The state diagram presented in the previous case can be extended by including the new statements 3.1–3.3 as shown in FIG. 5.

Case 4: A>0, B<0, A+B<0

Based on the above discussion, this case can easily be included into the finite-state machine which has been conveniently denoted by LZA.

TABLE V

| (a) | A | 0 0000000001000100010000000101001 |
| | B | 1 1111100110010100000110000010010 |
| | | P PPPPPPZZPGZZPPPZZPZZPPZZZPPPZPP |
| | | CARRY=0 |
| (b) | A | 0 0000000000001000100000000101001 |
| | B | 1 1111110100001010000011000010010 |
| | | P PPPPPPZPZZZZPPPZZPZZPPZZZPPPZPP |
| | | CARRY=0 |
| (c) | A | 0 0001111000001000100000000101001 |
| | B | 1 1101111100001010000011000010010 |
| | | P PPZGGGGPZZZZPPPZZPZZPPZZZPPPZPP |
| | | CARRY=0 |
| (d) | A | 0 0001111110000100010000000101001 |
| | B | 1 1101110110001010000011000010010 |
| | | P PPZGGGPGGZZZPPPZZPZZPPZZZPPPZPP |

TABLE V-continued

CARRY=1
MSB                                            LSB As can be seen from each individual example given in Table V, this case also begins with the P-state. Therefore, the conditions (3.1-3.2) described above will also be valid here. The next input entered after the P-state, however, is not a G- but a Z-input. Consequently, the new state of the LZA has to be different and it is designated by the G-state. The state conditions can now be extended as follows:

4.1-4.2 are the same as given in 3.1-3.2.

4.3- If the mth input is a Z-signal then create a LEFT-SHIFT output and go to the statement (2.2).

The total shift amounts are given by:

(a) SHL=7, AD=1, SH=6.

(b) SHL=7, AD=1, SH=6.

(c) SHL=7, AD=1, SH=6.

(d) SHL=6, AD=0, SH=6.

Figure 6:
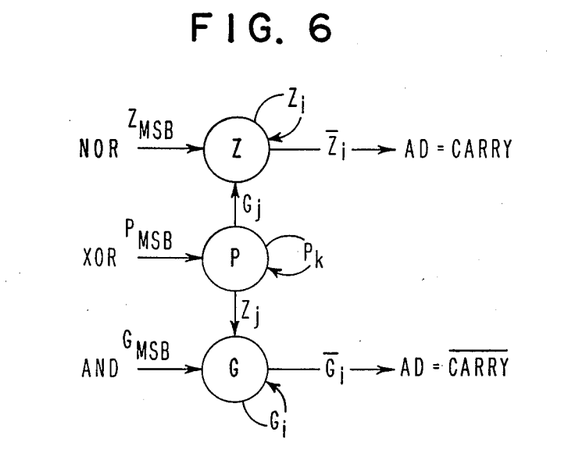
FIG. 6 illustrates the general state diagram of the present invention.

The general state diagram can then be obtained as shown in FIG. 6.

Apart from the CARRY dependent ADJUSTMENT, the logical descriptions of the finite-state machine representation can be obtained as follows:

$$Z = Z^k + P^i G Z^{k-(i+1)} \quad \text{(II.8)}$$

(Positive Result)

$$G = G^k + P^i Z G^{k-(i+1)} \quad \text{(II.9)}$$

(Negative Result)

As seen, the Z-state can occur either for the string of (k) Z-inputs or (i) P-inputs followed by a single G and the string of (k-i-1) Z-inputs. Similar statements can be made for the G-state.

Besides the total shift amount, the sequential model of the LZA also points out whether the final result of the addition is to be positive or negative depending on the previous state before finishing leading 0/1 anticipation. If the previous state is the Z-state then the final result is positive, otherwise it is negative since, as depicted in FIG. 6, the P-state always leads to the Z- or G-state.

Logarithmic Leading 0/1 Anticipator (LZA)

The finite-state model of the LZA allows entry of a string of serial inputs which, depending on the bit-length (N), may not always be as fast as a Carry-Lookahead Adder. It is therefore desirable to process the string of P-, G-, Z-inputs using a parallel algorithm similar to the Lookahead structure. The final construction, which first processes the input data in distinctly chosen blocks of block-length D, can be interpreted as a parallel implementation of the foregoing finite-state machine considering its combinational equivalents for different state and input combinations.

Accordingly, the leading 0/1 anticipation may be carried out digitwise, that is, using a block-length of 4-Bits, although the results can easily be extended to arbitrary block-lengths. Assuming that the beginning of a block is on the kth bit position, the possible input combinations at this position are given by:

```
           digit
           | |
           k
.... .... .... Z ... .... ....
.... .... .... P ... .... ....
.... .... .... G ... .... ....
```

According to the string between the kth and (k-3)th bit positions, the state outputs of the LZA are defined as follows:

$$ZZ_{1k} = Z_k Z_{(k-1)} Z_{(k-2)} Z_{(k-3)} \quad \text{(III.1)}$$

$$PP_{1k} = P_k P_{(k-1)} P_{(k-2)} P_{(k-3)} \quad \text{(III.2)}$$

$$PZ_{1k} = P_k P_{(k-1)}(P_{(k-2)} G_{(k-3)} + G_{(k-2)} Z_{(k-3)}) + \quad \text{(III.3)}$$
$$(P_k G_{(k-1)} + G_k Z_{(k-1)}) Z_{(k-2)} Z_{(k-3)}$$

$$PG_{1k} = P_k P_{(k-1)}(P_{(k-2)} Z_{(k-3)} + Z_{(k-2)} G_{(k-3)}) + \quad \text{(III.4)}$$
$$(P_k Z_{(k-1)} + Z_k G_{(k-1)}) G_{(k-2)} G_{(k-3)}$$

$$GG_{1k} = G_k G_{(k-1)} G_{(k-2)} G_{(k-3)} \quad \text{(III.5)}$$

It will be noted that the names of the intermediate state outputs correspond to their beginning and finishing states. For a block-length D ($3^D$ possible input combinations), the number of the input combinations resulting in an intermediate LZA block output is given by (2D+3). As shown in the following example, the 2D combinations occur for PZ-and PG-states.

| | PZ<br>1 2 . . . . D | | PG<br>1 2 . . . . D |
|---|---|---|---|
| 1 | G Z Z . . Z Z | 1 | Z G G . . G G |
| 2 | P G Z . . . Z | 2 | P Z G . . . G |
| . | P P G . . . . | . | P P Z . . . . |
| . | . . . G . . . | . | . . . Z . . . |
| . | . . . . G . Z | . | . . . . Z . G |
| . | P . . . . G Z | . | P . . . . Z G |
| D | P P . . P P G | D | P P . . P P Z |

Three additional combinations are due to the ZZ, PP-, and GG-states. This is important to ascertain the correctness of the logical equations in the general case and to compare the design complexity for different block-lengths.

Figure 7A:
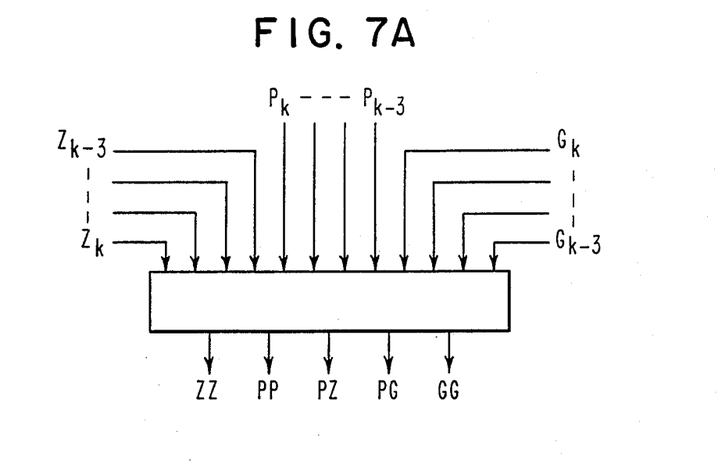
FIG. 7A shows a basic building block, in the form of a circuit or combinational network, for carrying out the method of the invention
Figure 7B:
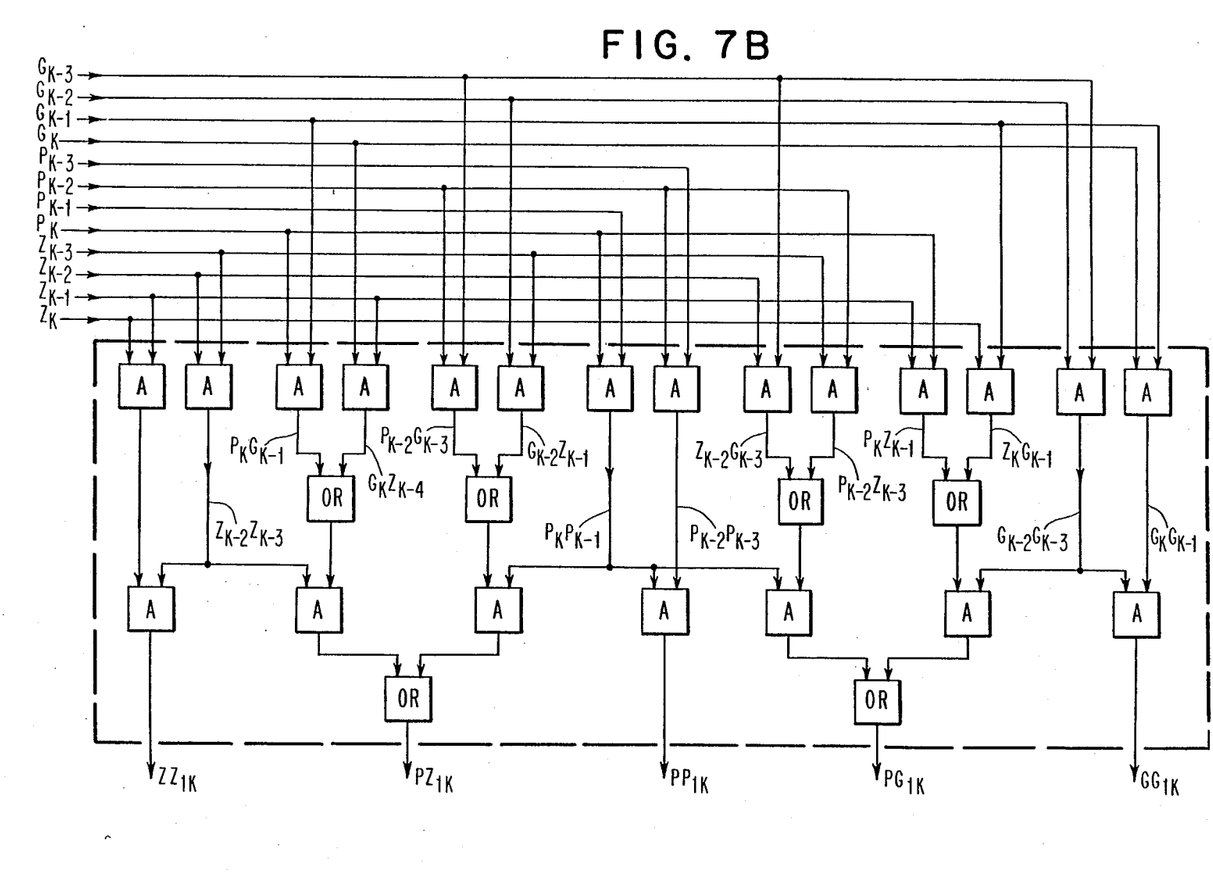
FIG. 7B is a suitable logic diagram therefor.

Looking back to the finite-state machine (FIG. 6), the new set of state equations designated in terms of the beginning and final inputs, is slightly different. Two new terms $$(G_k Z_{(k-1)} Z_{(k-2)} Z_{(k-3)}) \quad \text{(III.6)}$$

and $$(Z_k G_{(k-1)} G_{(k-2)} G_{(k-3)}) \quad \text{(III.7)}$$

are presented in the PZ- and PG-states that, in essence, would not occur in the LZA model given in FIG. 6. These expansions are due to the fact that each block handles the data without being informed about the results of the adjacent one. Hence, if the output state of the previous block is PP, then the consecutive state should be a PZ- or PG-output. The resulting basic building block of the LZA is shown in FIG. 7A and a suitable logic diagram for its implementation is given in FIG. 7B.

Figure 8A:
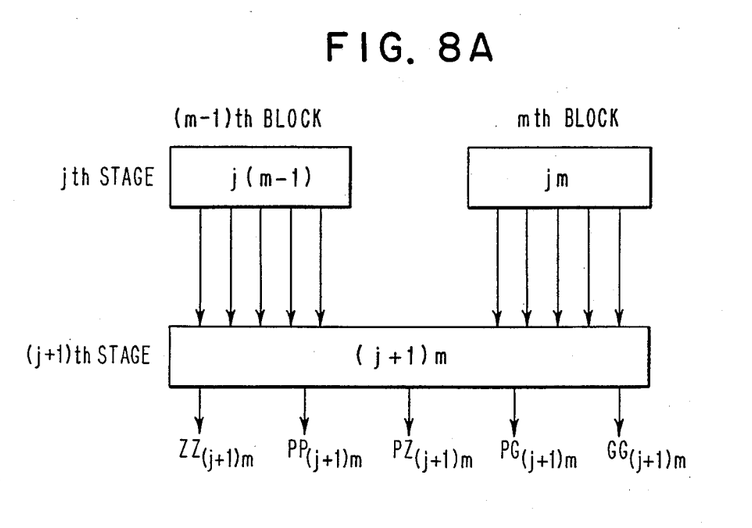
FIG. 8A shows a possible anticipation scheme for propagating different state outputs for an iterative combinational network and FIG. 8B is a suitable logic diagram therefor.
Figure 8B:
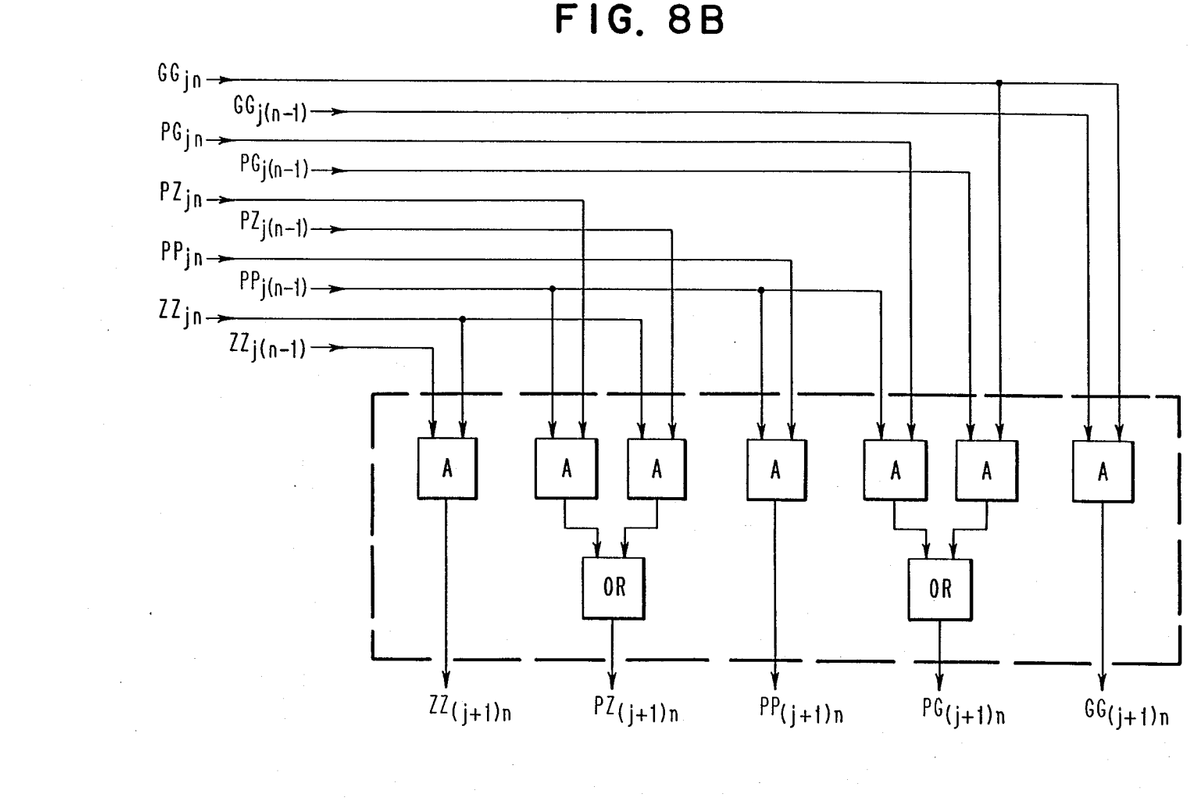

This circuit is a combinational network since its outputs are fully determined by the inputs. Thus the implementation of the sequential network is converted into the problem of propagating the different state outputs for the iterative combinational network. A preferred anticipation scheme for the state iteration is depicted in FIG. 8A and a suitable logic diagram for its implementation is given in FIG. 8B.

The logical equations necessary for the state iteration can be obtained by considering the input strings of the serial LZA for all possible cases.

$$
\begin{array}{cccc}
 & 1 & m-1 & m \\
(a) & ZZZZ & \ldots ZZZZ & ZZZZ \\
 & ZZ_{11} & \ldots ZZ_{1(m-1)} & ZZ_{1m}
\end{array}
\qquad (III.8)
$$

$$ZZ_{(j+1)m} = ZZ_{j(m-1)} ZZ_{jm}$$

$$
\begin{array}{cccc}
 & 1 & m-1 & m \\
(b) & PPPP & \ldots PPPP & PPPP \\
 & PP_{11} & \ldots PP_{1(m-1)} & PP_{1m}
\end{array}
\qquad (III.9)
$$

$$PP_{(j+1)m} = PP_{j(m-1)} PP_{jm}$$

$$
\begin{array}{cccc}
 & 1 & m-1 & m \\
(c) & PPPP & \ldots PPPP & PPGZ \\
 & PP_{11} & \ldots PP_{1(m-1)} & PZ_{1m}
\end{array}
\qquad (III.10)
$$

$$
\begin{array}{cccc}
 & 1 & m-1 & m \\
 & PPPP & \ldots PPGZ & ZZZZ \\
 & PP_{11} & \ldots PZ_{1(m-1)} & ZZ_{1m}
\end{array}
$$

$$PZ_{(j+1)m} = PP_{j(m-1)} PZ_{jm} + PZ_{j(m-1)} ZZ_{jm}$$

$$
\begin{array}{cccc}
 & 1 & m-1 & m \\
(d) & PPPP & \ldots PPPP & PPZG \\
 & PP_{11} & \ldots PP_{1(m-1)} & PG_{1m}
\end{array}
\qquad (III.11)
$$

$$
\begin{array}{cccc}
 & 1 & m-1 & m \\
 & PPPP & \ldots PPZG & GGGG \\
 & PP_{11} & \ldots PG_{1(m-1)} & GG_{1m}
\end{array}
$$

$$PG_{(j+1)m} = PP_{j(m-1)} PG_{jm} + PG_{j(m-1)} GG_{jm}$$

$$
\begin{array}{cccc}
 & 1 & m-1 & m \\
(e) & GGGG & \ldots GGGG & GGGG \\
 & GG_{11} & \ldots GG_{1(m-1)} & GG_{1m}
\end{array}
\qquad (III.12)
$$

$$GG_{(j+1)m} = GG_{j(m-1)} GG_{jm}$$

where $(j=1, 2, \ldots, (J-1))$ and $[m=(i^{(j-1)}+1), \ldots, M]$;

$M=N/D$, $J=\log_i M$, (J, M integers, i : Lookahead distance);

N: Total bit-length of the LZA;

D: Block-length; and

J: The number of the LZA stages necessary.

Although the equations for the state iteration are expressed in terms of the state outputs of the two adjacent blocks, they can be extended to arbitrary lookahead distances.

Figure 9:
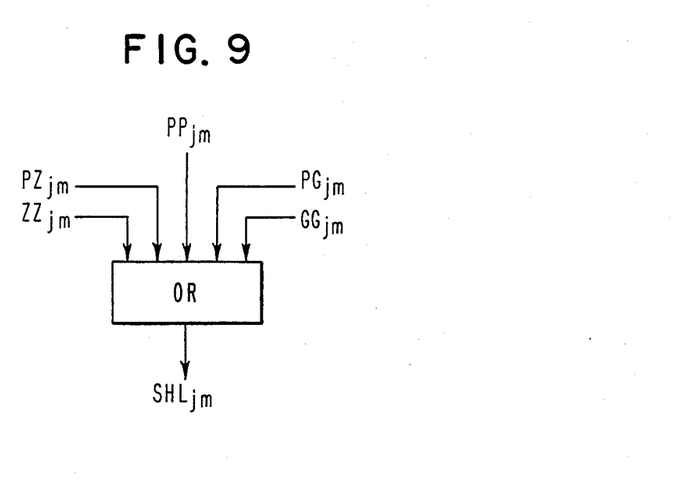
FIG. 9 is a suitable logic diagram for the function defined in Equation (III.13).

At any stage, an anticipated state can be generated by implementing the above equations and using auxiliary functions $ZZ_{1k}$, $PP_{1k}$, $PZ_{1k}$, $PG_{1k}$, and $GG_{1k}$. Each cell at the following iteration stages will have the intermediate ZZ-, PP, PZ-, PG-, GG-signals as inputs (to receive the information from its neighbors on the left and the top) and as outputs (to supply the anticipated states to its neighbors on the right and the bottom as well as to the network outputs). It is interesting to note that either (1) only one of these states can be TRUE (1), or (2) all of them are NOT TRUE (0), if no leading 0/1 has been detected. The LEFT-SHIFT signal can therefore be defined by:

$$SHL_{jm} = OR\ (ZZ_{jm}, PP_{jm}, PZ_{jm}, PG_{jm}, GG_{jm}) \qquad (III.13)$$

A logic diagram for this function is shown in FIG. 9.

At this point in the description, an example may be helpful in understanding the calculation of the SHL signals. Consider now the following input string:

$$
\begin{array}{ccccccc}
 1 & & m-2 & m-1 & m & m+1 & M \\
PPPP & \ldots & PPPP & PGZZ & ZZZZ & PZGP & \ldots \\
SH_{11} & \ldots & SH_{j(m-2)} & SH_{i(m-1)} & SH_{im} & SH_{x(m+1)} & \ldots SH_{JM} \\
1 & \ldots & 1 & 1 & 1 & 0 & \ldots 0
\end{array}
$$

Figure 10:
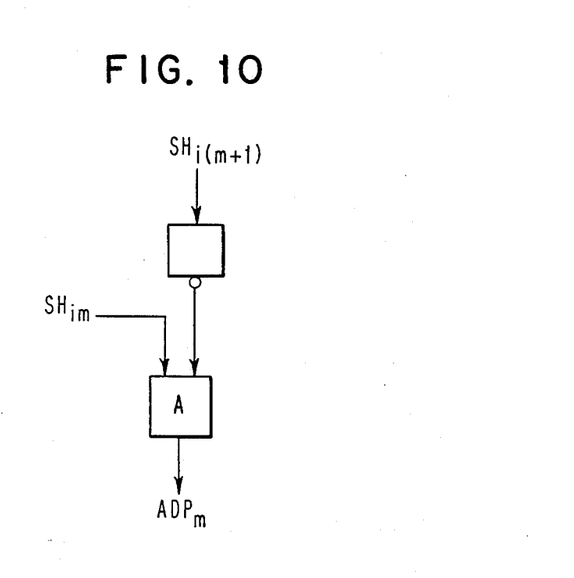
FIG. 10 is a suitable logic diagram for the function defined in Equation (III.14).

It will be seen that the LZA will give m LEFT-SHIFT signals beginning from the MSB side of the addition. It is then necessary to determine the ADJUSTMENT at the mth digit-position. A single signal is needed which points out that the CARRY input to the mth digit is to be taken into account in order to generate a RIGHT-SHIFT signal. This ADJUSTMENT-POSITION output can be created using the string of the SHL signals.

$$ADP_m = SH_{im} INV(SH_{i(m+1)}) = SH_{im} XOR(SH_{i(m+1)}) \qquad (III.14)$$

The logic diagram for this function in FIG. 10 illustrates that $ADP_m$ will be TRUE if, and only if, the two SH-signals are different. As pointed out above, the SH-signals consist of a TRUE bit-string followed by the NOT TRUE one. Therefore, $ADP_m$ will be TRUE at the transition digit. Again considering the example:

$$
\begin{array}{c}
1 \ldots\ m\ \ldots M \\
\text{Output} \rightarrow 11 \ldots 11100 \ldots 00 \\
00 \ldots 00111 \ldots 11 \\
00 \ldots 00100 \ldots 00 \\
ADP_m
\end{array}
$$

The ADJUSTMENT in that case becomes:

$$AD_m = ADP_m CARRY \qquad (III.15)$$

or $$AD_m = ADP_m INV(CARRY) \qquad (III.16)$$

depending upon the state in which the leading 0/1 anticipation has been finished. Interestingly, if the finishing state is PP, then $$AD_m = 0, \qquad (III.17)$$

since both cases, CARRY=1 and CARRY=0, would only determine whether the result is positive or negative but would not change the shift amount.

Based on the above discussion, it will be seen that the LZA would preferably include a (N/4) LEFT- (1) RIGHT-SHIFTER, where N is the Bit-length of the leading 0/1 anticipation.

Processing the shift signals depends on the realization of a suitable shifter. Accordingly, a simple approach will now be presented in order to demonstrate some interesting features of the output signals of the LZA as well as how the SHIFT operation can be carried out effectively. For large Bit-lengths, performing the SHIFT operation in a single level would require a large number (maximum) of subcycles. In such cases, this operation could be carried out in different SHIFT levels. For example, m=14 can be split up by:

3 times 4-Digit LEFT-SHIFT 2 times 1-Digit LEFT-SHIFT

The multilevel SHIFT signals can be generated in the same manner as $ADP_m$, e.g., by connecting the SHL-signals at appropriate distances. An n-Digit LEFT-SHIFT is defined by:

$$NSH_m = SH_m INV(SH_{m+n}) \quad (III.18)$$

Referring back to the previous example, a 4-Digit LEFT-SHIFT can be created as follows:

| Digits | 4    | 8    | 12   | 16   |               |
|--------|------|------|------|------|---------------|
| SHL    | 1111 | 1111 | 1111 | 1100 | ...           |
|        | 0    | 0    | 1    | 1    | ...           |
| 4SH    | 0    | 0    | 1    | 0    | ...3 × 4-Digit |
| 1SH    | 000  | 000  | 000  | 010  | ...2 × 1-Digit |

Note that generating the ADP signal already provided the number of the 1-Digit LEFT-SHIFT because this case corresponds to (n=1).

IMPLEMENTATION OF THE BITWISE NORMALIZATION

Using the above implementation, the leading 0/1 anticipation can be performed with a 3-bit accuracy in the worst case. In order to obtain the exact shift amount, this network can easily be extended to a bitwise normalization; however, this would require some supplementary logic to determine the exact shift position. In any event, after finishing the blockwise leading 0/1 anticipation, the ADJUSTMENT-POSITION signal points out in which block the exact shift position is to be found. Defining $$ZZ_{1k}=Z_k, PP_{1k}=P_k, GG_{1k}=G_k \quad (IV.1)$$

the consecutive states can be described by applying the logical expressions given in Eqs. (III.1-5) to the actual case. The SHIFT signals, stripping out the appropriate bit amount (k=1, 2, 3), are obtained in the same manner as the preceding discussion.

SPECIAL REALIZATIONS

A special implementation of the LZA is obtained when one of the operands in the floating point addition is assumed to be always positive resulting in:

$$G_{11}=0 \quad (V.1)$$

This supposition also simplifies other consecutive state anticipations. At the end, it can readily be shown that the LEFT-SHIFT signals are defined by:

$$SHL_{jk}=OR(ZZ_{jk}, PP_{jk}, PZ_{jk}, PG_{jk}) \quad (V.2)$$

Note that the intermediate state $GG_{jk}(j>1)$ may still be other than zero.

Figure 11:
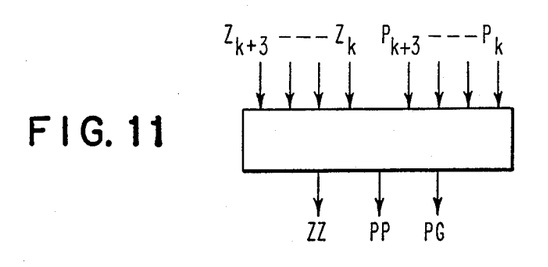
FIG. 11 shows a simplified combinational network for carrying out the method of the invention for the special case when the register lengths of the operands are not equal so that part of the longer operand can be interpreted as zero.

Another interesting constraint is that, in addition to the previous assumption, the register lengths of the two operands may not be equal. This is commonly encountered during a floating point addition to achieve equal exponents for both operands. For example, let the bit-lengths of A and B be m and n, respectively, where m<n. The first (n−m) bits of the operand A can be interpreted to be zero. Therefore, the general basic building block of FIG. 7A can be simplified as shown in FIG. 11.

Note that, only the PP, ZZ, or PG states can occur in the first (n−m) bit positions. If the state PG occurs in the kth bit position (k<n−m) then leading 0/1 anticipation will be finished since the subsequent state input can only be P or Z but not G. The LEFT-SHIFT signals can be created using:

$$SHL_{jk}=OR(ZZ_{jk}, PP_{jk}, PG_{jk}) \text{ for } (k<n-m) \quad (V.3)$$

The leading 0/1 anticipation can continue if, and only if, and only if, the PG-state occurs for k=n−m in which there are two possible implementations. If j is defined $$j = \text{mod}_D(n-m) \quad (V.4)$$

For j=0, the entire LZA can be implemented using the building blocks depicted in FIGS. 7A and 11.

Figure 12:
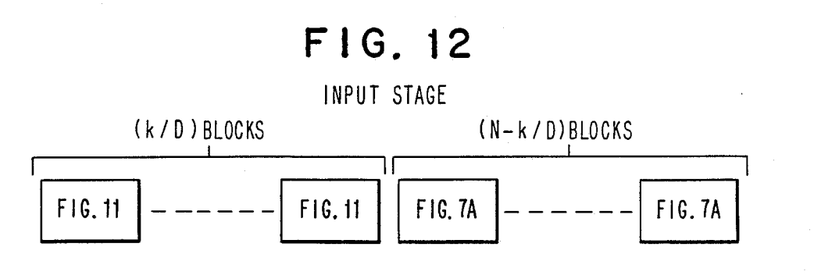
FIGS. 12 and 13 show implementations of the invention using special arrangements of the combinational networks of FIGS. 7 and 11.

The construction for D=4 is shown in FIG. 12.

Figure 13:
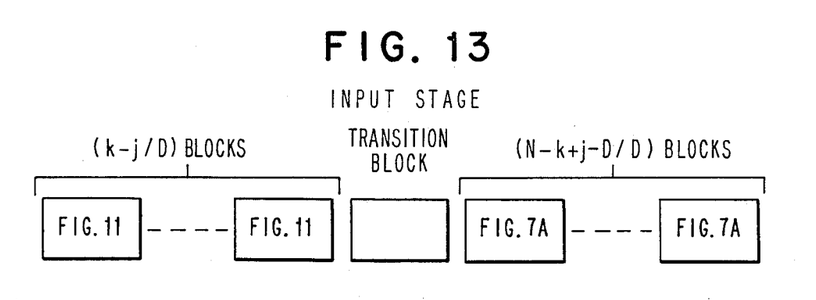

For j>0, a new transition block is to be realized by reducing the appropriate state expressions in eqs. (III.-1-5) according to the value (j). When j=1, PZ and GG are to be simplified; and, when j>1, PZ, PG, and GG are to be simplified. This special realization is shown in FIG. 13.

It will be appreciated that starting the LZA with a reduced set of state equations simplifies the entire implementation.

Figure 14:
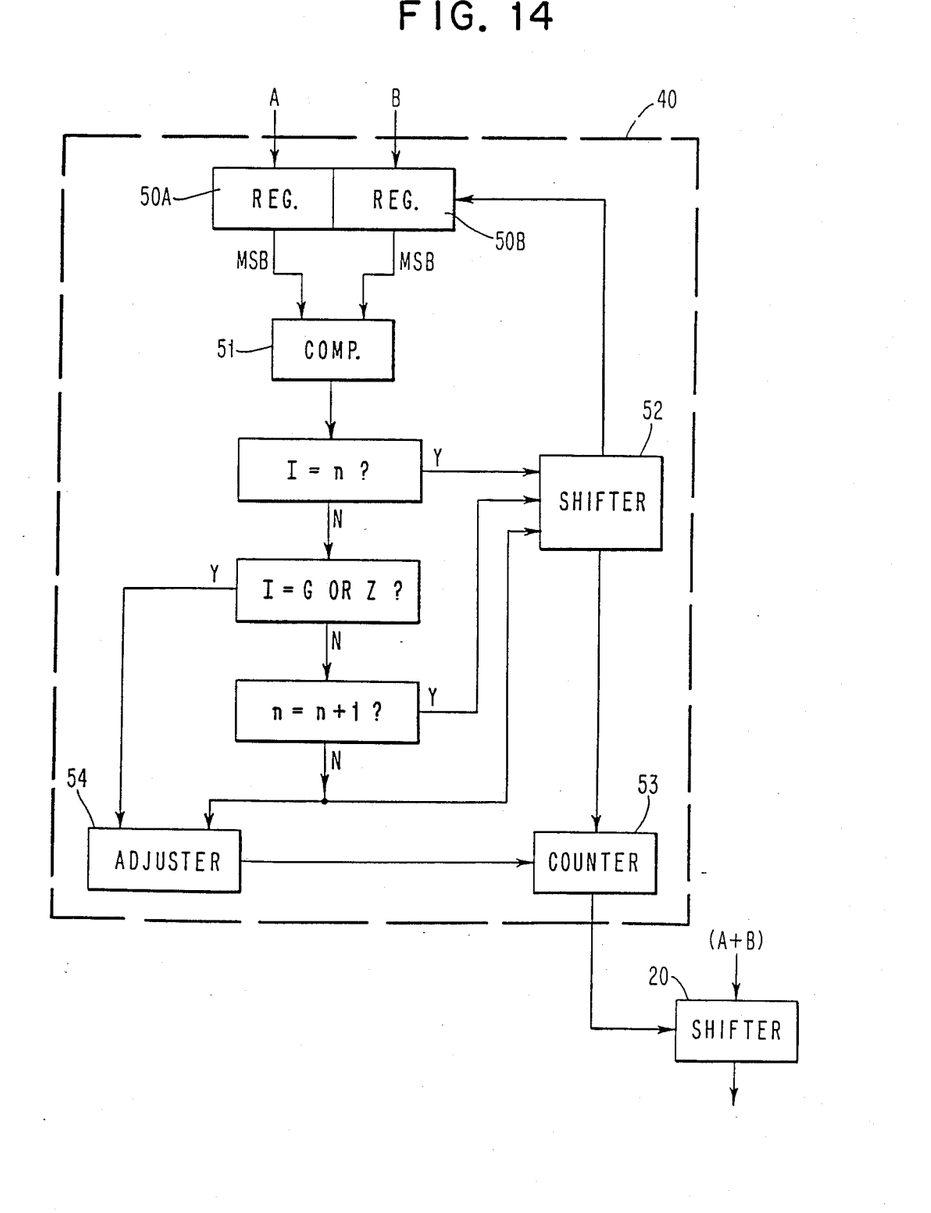
FIG. 14 is a flow diagram generally illustrating the operation of the elements of the LZA component 40 indicated in FIG. 2.

In summary, FIG. 14 is a flow diagram generally illustrating the operation of the elements of the LZA component 40 indicated in FIG. 2. Briefly, the operands A and B are received in registers 50a and 50b, respectively, and their most significant bits (MSB) are successively compared in comparator 51 which outputs P, G, or Z state signals, as appropriate. The state of the initial state signal I is compared with the state of each of the subsequently-produced state signals n to determine whether the result is TRUE or NOT TRUE. If TRUE, a shift signal is produced causing shifter 52 to shift the operands in registers 50a and 50b to continue the state comparisons. Each shift signal output by shifter 52 is also counted by a counter 53. When the comparison becomes NOT TRUE, it is determined whether the initial state I is either G or Z. If it is either, shifting ceases and a signal is output to cause adjuster 54 to produce an adjustment signal that is input to the counter 53. If the initial state is P rather than G or Z, then the state of signal n is compared with that of signal n+1. If the comparison is TRUE, a signal is sent to shifter 52 to continue the shifting operation on the operands A and B. If the comparison is NOT TRUE, then a signal is output to the shifter 52 to produce one more shift and a subsequent signal is output to adjuster 54 to send an adjustment signal to the counter 53. Following the receipt of an adjustment signal, the counter 53 outputs a signal, indicative of the sum of the counts and the adjustment signal, to the shifter 20 which then proceeds to normalize the sum of the operands A and B, all in a manner as has been described in detail above.

It will accordingly be seen that a system and method have been disclosed to facilitate a computerized floating-point addition by performing a leading 0/1 anticipation (LZA) in parallel with the addition operation, so that the Addition-Normalization time may be significantly reduced. The invention may be incorporated in various electronic processing equipment components, e.g., either CPUs or peripherals. Also, modifications and simplifications of the basic implementing network have been described generally and particularly for special cases in a manner that will permit those skilled in the art to fully utilize the teachings in ways not specifically described.

Whe claim:

1. A method of normalizing the result of a floating point addition in a computer by carrying out leading zero processing in parallel with the addition of the operands (A and B), comprising the steps of:

starting with the most significant bit (MSB) side of the operands, comparing the bits in corresponding bit positions of the operands (A and B), and producing appropriate XOR (P), AND (G), and NOR (Z) state signals in accordance with the comparisons;

detecting the state of the initial state signal and producing a shift amount signal indicating a shift amount for each successive state signal produced;

when said state of said initial state signal is G or Z, halting the production of said shift amount signals when the state of a subsequently produced state signal first becomes NOT TRUE with respect to said state of said initial state signal indicating a second state when said state of said initial state signal is P and the state of a subsequently produced state signal first becomes NOT TRUE with respect to said state of said initial state signal indicating a second state (G or Z), which state at the NOT TRUE bit position is followed by a state signal of the third state (Z or G), then continuing to produce shift amount signals for each successive state signal produced as long as said third state remains TRUE and halting the production of said shift amount signals when the third state becomes NOT TRUE;

otherwise, when said initial state is P, halting the shift signals at one bit position following the NOT TRUE bit position;

producing an adjustment signal when the production of said shift amount signals is halted; and counting the shift amounts and summing the count with said adjustment signal to determine the exponent of the sum of the floating point addition.

2. A method as in claim 1, wherein said adjustment signal is determined by the CARRY at the bit position at which the shift signals are halted.

3. A method as in claim 1, further comprising the step of using the state at the bit position at which the shift signals are halted to determine whether the result of the addition is positive or negative.

4. Apparatus for normalizing the result of a floating point addition in a computer by carrying out leading zero processing in parallel with the addition of the operands (A and B), comprising:

means for comparing the bits in corresponding bit positions of the operands (A and B) and producing XOR (P), AND (G), and NOR (Z) state signals in accordance therewith;

means for actuating said comparing means to start with the most significant bit (MSB) side of the operands and produce appropriate XOR (P), AND (G), and NOR (Z) state signals by comparing the bits in corresponding bit positions of the operands (A and B);

means for detecting the state of the initial state signal produced;

means for outputting a shift amount signal indicating a shift amount for each successive state signal produced;

means, actuated when said state of said initial state signal is G or Z, for halting the outputting of said shift amount signals by said outputting means when the state of a subsequently produced state signal first becomes NOT TRUE with respect to said state of said initial state signal indicating a second state means, actuated when said state of said initial state signal is P and the state of a subsequently produced state signal first becomes NOT TRUE with respect to said state of said initial state signal indicating a second state (G or Z), which state at the NOT TRUE bit position is followed by a state signal of the third state (Z or G), for halting the outputting of said shift amount signals by said outputting means when the third state becomes NOT TRUE;

means, actuated when said initial state is P and the second state (G or Z) at the NOT TRUE bit position is not followed by a state signal of the third state, for halting the outputting of shift signals by said outputting means at one bit position following the NOT TRUE bit position;

means for producing an adjustment signal when the outputting of said shift amount signals is halted; and means for counting the shift amount signals and summing the shift amount count with the adjustment signal to determine the exponent of the sum of the floating point addition.

5. Apparatus as in claim 4, wherein said adjustment signal producing means produces an adjustment signal determined by the CARRY at the bit position at which the shift signals are halted.

6. Apparatus as in claim 4, further comprising means for using the state at the bit position at which the shift signals are halted to determine whether the result of the addition is positive or negative.

7. Apparatus for normalizing the result of a floating point addition in a computer by carrying out the leading zero detection (LZD) in parallel with the addition of the operands (A and B) to provide a leading zero anticipation (LZA), comprising:

means for sequentially comparing the bits in corresponding bit positions of the operands (A and B) being added and for producing appropriate XOR (P), AND (G) and NOR (Z) state signals resulting from the comparing, starting with the most significant bit (MSB) side of the addition;

means for detecting the state of the initial state signal produced and for detecting when said state becomes NOT TRUE;

means for outputting a shift amount signal for each successive state signal produced;

means for halting the outputting of said shift amount signals by said outputting means;

means, responsive to said detecting means, for actuating said halting means to halt the outputting of said shift amount signals by said outputting means when said initial state is G or Z and said state becomes NOT TRUE;

means, responsive to said detecting means, for actuating said halting means to halt the outputting of said shift amount signals by said outputting means when said initial state is P and the second state (G or Z) at the NOT TRUE bit position is followed by a state signal of the third state, and the third state becomes NOT TRUE;

means, responsive to said detecting means, for actuating said halting means to halt the outputting of said shift amount signals by said outputting means at one bit position following the NOT TRUE position when said initial state is P and the second state (G or Z) at the NOT TRUE bit position is not followed by a state signal of the third state;

means for producing an adjustment signal when the outputting of said shift amount signals is halted; and means for counting said shift amount signals and summing the count with said adjustment signal to determine the exponent of the sum of the floating point addition of the operands (A and B).

8. Apparatus as in claim 7, further comprising:

means for using the state at the bit position at which the shift signals are halted to determine whether the result of the addition is positive or negative.

9. Apparatus as in claim 7, further comprising:

means, responsive to said detecting means, for actuating said adjustment signal producing means to produce an adjustment signal determined by the CARRY at the bit position at which the shift signals are halted.

10. A method for normalizing the result of a floating point addition in a computer by carrying out the leading zero detection (LZD) in parallel with the addition of the operands (A and B) to provide a leading zero anticipation (LZA), comprising the steps of:

sequentially comparing the bits in corresponding bit positions of the operands (A and B) being added and producing appropriate XOR (P), AND (G) and NOR (Z) state signals resulting from the comparing, starting with the most significant bit (MSB) side of the addition;

detecting the state of the initial state signal produced and detecting when said state becomes NOT TRUE;

outputting a shift amount signal for each successive state signal produced;

halting the outputting of said shift amount signals if said initial state is G or Z, when said state becomes NOT TRUE;

halting the outputting of said shift amount signals if said initial state is P and the second state (G or Z) at the NOT TRUE bit position is followed by a state signal of the third state, when the third state becomes NOT TRUE;

halting the outputting of said shift amount signals at one bit position following the NOT TRUE position if said initial state is P, when the second state (G or Z) at the NOT TRUE bit position is not followed by a state signal of the third state;

producing an adjustment signal when the outputting of said shift amount signals is halted; and counting said shift amount signals and summing the count with said adjustment signal to determine the exponent of the sum of the floating point addition of the operands (A and B).

11. A method as in claim 10, further comprising the step of:

using the state at the bit position at which the shift signals are halted to determine whether the result of the addition is positive or negative.

12. A method as in claim 10, further comprising the step of:

determining said adjustment signal by the CARRY at the bit position at which the shift signals are halted.

13. A combinational network for normalizing the result of a floating point addition in a computer by carrying out the leading zero processing in parallel with the addition of the operands (A and B), comprising:

means for comparing the bits in corresponding bit positions of the operands (A and B) being added;

means, starting with the most significant bit (MSB) side of the addition, for providing appropriate state inputs in the form of blocks of n bits in length, said inputs comprising $Z_1$ to $Z_n$, $P_1$ to $P_n$, and $G_1$ to $G_n$ state signals resulting from the comparing of the bits in corresponding bit positions by said comparing means;

means responsive to said state inputs for producing intermediate state outputs comprising ZZ, PP, PZ, PG, and GG signals;

means for ORing said intermediate state outputs and producing signals indicative of a shift count;

means for creating an adjustment signal based on the bit position at the end of the shift count;

means for summing the shift count with the adjustment signal to determine the exponent of the sum of the floating point addition of the operands (A and B).

14. A network as in claim 13, further comprising means for using the state of the bit position at the end of the shift count to determine whether the result of the addition is positive or negative.

15. A method using a combinational network for normalizing the result of a floating point addition in a computer by carrying out the leading zero processing in parallel with the addition of the operands (A and B), comprising the steps of:

comparing the bits in corresponding bit positions of the operands (A and B) being added;

starting with the most significant bit (MSB) side of the addition, providing appropriate state inputs in the form of blocks of n bits in length, said inputs comprising $Z_1$ to $Z_n$, $P_1$ to $P_n$, and $G_1$ to $G_n$ state signals resulting from the comparing of the bits in corresponding bit positions;

producing intermediate state outputs comprising ZZ, PP, PZ, PG, and GG signals, in response to said state inputs;

ORing said intermediate state outputs and producing signals indicative of a shift count;

creating an adjustment signal based on the bit position at the end of said shift count; and summing said shift count with said adjustment signal to determine the exponent of the sum of the floating point addition of the operands (A and B).

16. A method as in claim 15, further comprising the step of using the state of the bit position at the end of said shift count to determine whether the result of the addition is positive or negative.

* * * * *